United States Patent
England et al.

(10) Patent No.: US 8,835,565 B2
(45) Date of Patent: Sep. 16, 2014

(54) PREFORMED STABILIZERS USEFUL FOR THE PRODUCTION OF POLYMER POLYOLS AND POLYMER POLYOLS PRODUCED THEREFROM

(75) Inventors: Jiong England, Audubon, PA (US); Rick L. Adkins, Dunbar, WV (US); Brian L. Neal, Scott Depot, WV (US); William Gill, South Charleston, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 32 days.

(21) Appl. No.: 13/449,492

(22) Filed: Apr. 18, 2012

(65) Prior Publication Data

US 2013/0281627 A1    Oct. 24, 2013

(51) Int. Cl.
| | | |
|---|---|---|
| *C08L 63/00* | (2006.01) | |
| *C08F 2/38* | (2006.01) | |
| *C08F 36/04* | (2006.01) | |
| *C08F 14/06* | (2006.01) | |
| *C08F 10/00* | (2006.01) | |
| *C08F 8/30* | (2006.01) | |

(52) U.S. Cl.
CPC . *C08F 2/38* (2013.01); *C08F 36/04* (2013.01); *C08F 14/06* (2013.01); *C08F 8/30* (2013.01); *C08F 10/00* (2013.01); *C08L 63/00* (2013.01)
USPC ........... 525/118; 525/296; 525/302; 525/309; 526/222; 526/223; 526/225; 526/227

(58) Field of Classification Search
CPC ............ C08L 63/00; C08F 2/38; C08F 36/04; C08F 14/06; C08F 10/00; C08F 8/00; C08F 8/30; C08F 265/06
USPC .......... 524/320; 525/263, 273, 298, 302, 309, 525/118; 526/222, 223, 225, 227
See application file for complete search history.

(56) References Cited

U.S. PATENT DOCUMENTS

| | | | |
|---|---|---|---|
| RE28,715 E | | 2/1976 | Stamberger |
| RE29,118 E | | 1/1977 | Stamberger |
| 4,242,249 A | | 12/1980 | Van Cleve et al. |
| 4,454,255 A | | 6/1984 | Ramlow et al. |
| 4,458,038 A | | 7/1984 | Ramlow et al. |
| 4,460,715 A | | 7/1984 | Hoffman et al. |
| 4,550,194 A | | 10/1985 | Reichel et al. |
| 4,652,589 A | | 3/1987 | Simroth et al. |
| 4,997,857 A | | 3/1991 | Timberlake et al. |
| 5,196,476 A | | 3/1993 | Simroth |
| 5,268,418 A | | 12/1993 | Simroth |
| 5,814,699 A | | 9/1998 | Kratz et al. |
| 5,990,185 A | | 11/1999 | Fogg |
| 6,013,731 A | | 1/2000 | Holeschovsky et al. |
| 6,172,164 B1 * | | 1/2001 | Davis et al. .................. 525/263 |
| 6,455,603 B1 | | 9/2002 | Fogg |
| 7,148,288 B2 | | 12/2006 | Borst et al. |
| 7,776,969 B2 * | | 8/2010 | Adkins ......................... 525/263 |
| 2010/0160469 A1 | | 6/2010 | Adkins et al. |
| 2012/0041144 A1 * | | 2/2012 | Adkins et al. ................ 524/762 |

FOREIGN PATENT DOCUMENTS

EP          0786480 B1      7/2003

* cited by examiner

*Primary Examiner* — Michael M Bernshteyn
(74) *Attorney, Agent, or Firm* — Robert S. Klemz

(57) ABSTRACT

Preformed stabilizers useful for the production of low viscosity, high solids polymer polyols are produced by free-radical polymerization of: (a) at least one ethylenically unsaturated macromolecule or macromer with (b) at least three different ethylenically unsaturated monomers in the presence of (c) at least one free-radical polymerization initiator, and, optionally, (d) a liquid diluent, and, optionally, (e) a chain transfer agent.

14 Claims, No Drawings

PREFORMED STABILIZERS USEFUL FOR THE PRODUCTION OF POLYMER POLYOLS AND POLYMER POLYOLS PRODUCED THEREFROM

BACKGROUND OF THE INVENTION

The present invention relates to preformed stabilizers useful for the production of polymer polyols, to polymer polyols produced from these preformed stabilizers and to processes for the production of these preformed stabilizers and polymer polyols. This invention also relates to a process for the production of polyurethane foams from the polymer polyols produced from the preformed stabilizers of the present invention and to the resultant foams.

Polymer polyol compositions suitable for use in producing polyurethane foams, elastomers and the like are known to those skilled in the art. Such polymer polyol compositions are used to produce two major types of polyurethane foams—slabstock and molded. Slabstock foams are used in the carpet, furniture and bedding industries. Primary uses of slabstock foam are as carpet underlay and furniture padding. High resiliency (HR) molded foam is the type of molded foam generally made. HR molded foams are used in the automotive industry for a number of applications ranging from molded seats to energy-absorbing padding.

Some of the earliest polymer polyol compositions are disclosed in U.S. Pat. Re. 28,715 (reissue of U.S. Pat. No. 3,383,351) and U.S. Pat. Re. 29,118 (reissue of U.S. Pat. No. 3,304,273). These disclosures teach that a stable dispersion of polymer particles in a polyol can be produced by polymerizing one or more ethylenically unsaturated monomer dissolved or dispersed in a polyol in the presence of a free radical catalyst.

The first commercial polymer polyol compositions were produced using acrylonitrile. Many of these acrylonitrile-based compositions possessed such high viscosities that they were undesirable for certain applications. More recently, acrylonitrile-styrene monomer mixtures have been used commercially to make the polymer component of polymer polyols. The expanding demand for polymer polyols has highlighted several product needs and this has spawned additional advances in technology.

Polymer polyols derived from such high styrene monomer mixtures appear incapable of satisfying ever-increasing market requirements for stability and increased load-bearing characteristics in foams. Polymer polyols with increased load-bearing characteristics can be obtained by increasing their polymer or solid contents. Solid contents of from 30 to 60 weight percent, or higher, are desirable. However, polymer polyols having increased solid contents without reduced stability of the polymer polyol and undesirably increased viscosity have not been disclosed in the prior art.

Use of high styrene monomer mixtures and high solid content polymer polyols has generally resulted in polymer polyols having undesirably high viscosity. The viscosity of a polymer polyol should be sufficiently low for ease of handling during its manufacture. In addition, the viscosity should facilitate transport, handling and, ultimately, adequate processability, in the foam processing equipment being used. Increased use of sophisticated mixing systems, such as impingement systems, makes excessive viscosity of the polymer polyol a significant problem. There is therefore a need for lower viscosity polymer polyols which satisfy the increased demands in the art.

As previously indicated, polymer polyol stability is a concern to makers of polyurethanes. At one time, seediness or filterability, a measure of stability of polymer polyols, was not a major issue in commercial practices. However, advances in the state of the art of polyurethane production have resulted in changes to polymer polyol stability criteria, especially in the molded foam area.

With commercial developments in sophisticated, high-speed and large-volume equipment and systems for handling, mixing and reacting polyurethane-forming ingredients, the need for highly stable and low viscosity polymer polyols has evolved. Polymer polyols must meet certain minimum requirements for satisfactory processing in such sophisticated foam equipment. Typically, the prime requirement is that the polymer polyols possess sufficiently small particles that filters, pumps and the like do not become plugged or fouled within relatively short periods of time.

Though there have been advances in reduction in viscosity and increase in solids of polymer polyols, there remains a need for improvement in viscosity reduction and increase in solids content. Greater reductions in viscosity are needed to meet market demands and greater effective increases in solids content are also needed by the market. More importantly, there is a need for technology in polymer polyols that maximizes viscosity reduction while also providing a viable mechanism to higher solids content.

The general concept of using stabilizer precursors in polymerization is disclosed in, for example, U.S. Pat. Nos. 4,454,255 and 4,458,038. The macromer in these patents may be obtained by reacting a polyol with a compound having reactive ethylenic unsaturation such as, for example, maleic anhydride or fumaric acid. Another description of this technique can be found in U.S. Pat. No. 4,460,715. The reactive unsaturation in the stabilizer described in U.S. Pat. No. 4,460,715 is provided by an acrylate or methacrylate moiety.

U.S. Pat. No. 4,242,249 discloses improved polymer polyols prepared by utilizing certain preformed dispersants or preformed stabilizers. These polymer polyols provide stability satisfactory for commercial production, and use of at least one of the following: (1) higher amounts of styrene or other co-monomer when acrylonitrile copolymer polymer polyols are being prepared, (2) higher polymer contents or (3) lower molecular weight polyols.

Other disclosures which describe stabilizer precursors (or macromers) for polymer polyols include, for example, U.S. Pat. Nos. 4,550,194, 4,652,589, and 4,997,857. The stabilizer precursors of U.S. Pat. No. 4,997,857 are characterized by these four features: (1) they are prepared from a starting polyol having a functionality greater than 4; (2) they have at least 60% retained unsaturation; (3) they have viscosities greater than 2000 centipoise at 25° C.; and (4) the starting polyol is capped with ethylene oxide and/or the adduct formed between the starting polyol and a reactive unsaturated compound is capped with ethylene oxide.

A pre-formed stabilizer (PFS) is particularly useful for preparing a polymer polyol having a lower viscosity at a high solids content. In the pre-formed stabilizer processes, a macromer is reacted with monomers to form a co-polymer of macromer and monomers. These co-polymers composed of a macromer and monomers are commonly referred to as pre-formed stabilizers (PFS). Reaction conditions may be controlled so that a portion of the co-polymer precipitates from solution to form a solid. In many applications, a dispersion having a low solids content (e.g., 3 to 15% by weight) is obtained.

Preferably, the reaction conditions are controlled so that the particle size is small, thereby enabling the particles to function as "seeds" in the polymer polyol reaction.

For example, U.S. Pat. No. 5,196,476 discloses a pre-formed stabilizer composition prepared by polymerizing a macromer and one or more ethylenically unsaturated monomers in the presence of a free-radical polymerization initiator and a liquid diluent in which the pre-formed stabilizer is essentially insoluble.

EP 0,786,480 discloses a process for the preparation of a pre-formed stabilizer by polymerizing, in the presence of a free-radical initiator, from 5 to 40% by weight of one or more ethylenically unsaturated monomers in the presence of a liquid polyol comprising at least 30% by weight (based on the total weight of the polyol) of a coupled polyol which may contain induced unsaturation. These pre-formed stabilizers can be used to prepare polymer polyols which are stable and have a narrow particle size distribution. The coupled polyol is necessary to achieve a small particle size (preferably ranging from 0.1 to 0.7 micron) in the pre-formed stabilizer.

U.S. Pat. Nos. 6,013,731 and 5,990,185 also disclose pre-formed stabilizer compositions composed of the reaction product of a polyol, a macromer, at least one ethylenically unsaturated monomer, and a free radical polymerization initiator.

SUMMARY OF THE INVENTION

The present invention is directed to new preformed stabilizers useful for the production of low viscosity, high solids polymer polyols, low viscosity polymer polyols having high solids contents from these preformed stabilizers and to processes for the preparation of these preformed stabilizers and low viscosity polymer polyols. The present invention also relates to a process for the production of polyurethane foams from these low viscosity polymer polyols and to the resultant polyurethane foams.

The preformed stabilizers of the present invention are the free-radical polymerization products of: (1) at least one ethylenically unsaturated macromer with (2) at least three ethylenically unsaturated monomers in the presence of (3) at least one free-radical polymerization initiator, and, optionally, (4) a liquid diluent, and, optionally, (5) a chain transfer agent.

The low viscosity polymer polyols of the present invention are the free-radical polymerization products of (A) a base polyol, (B) a preformed stabilizer of the present invention, and (C) at least one ethylenically unsaturated monomer formed in the presence of (D) a free-radical polymerization initiator, and (E) at least one polymer control agent and, optionally (F) a chain transfer agent.

The preformed stabilizers of the present invention are formed by a free-radical polymerization process in which: (1) at least one ethylenically unsaturated macromer is polymerized with (2) at least three ethylenically unsaturated monomers in the presence of (3) at least one free-radical polymerization initiator, and, optionally, (4) a liquid diluent, and, optionally, (5) a chain transfer agent.

The low viscosity, high solids polymer polyols of the present invention are produced by free-radically polymerizing a base polyol, the pre-formed stabilizer of the present invention and at least one ethylenically unsaturated monomer in the presence of a free-radical polymerization initiator, and optionally, a polymer control agent.

In the process for the production of polyurethane foams of the present invention, a polyisocyanate component is reacted with an isocyanate-reactive component that includes a low viscosity polymer polyol of the present invention in the presence of at least one catalyst and at least one blowing agent.

The polyurethane foams of the present invention are the reaction products of a polyisocyanate component with an isocyanate-reactive component that includes at least one low viscosity polymer polyol of the present invention produced in the presence of at least one catalyst and at least one blowing agent.

DETAILED DESCRIPTION OF THE INVENTION

As used herein, the following terms shall have the following meanings.

The term "monomer" means the simple unpolymerized form of a chemical compound having a relatively low molecular weight, e.g., acrylonitrile, styrene, methyl methacrylate, and the like.

The phrase "free radically polymerizable ethylenically unsaturated monomer" means a monomer containing ethylenic unsaturation (>C=C<, i.e. two double bonded carbon atoms) that is capable of undergoing free radically induced addition polymerization reactions.

The term pre-formed stabilizer is defined as an intermediate obtained by reacting a macromer containing reactive unsaturation (e.g., acrylate, methacrylate, maleate, etc.) with monomers (i.e. acrylonitrile, styrene, methyl methacrylate, etc.), optionally, in a polymer control agent (PCA) such as methanol, isopropanol, toluene, ethylbenzene, etc. and/or optionally, in a polyol, to give a co-polymer (dispersion having, e.g., a low solids content (e.g. <30%), or soluble grafts, etc.).

The term "stability" means the ability of a material to maintain a stable form such as the ability to stay in solution or in suspension for a period of at least 30 days.

The phrase "polymer polyol" refers to a composition produced by polymerizing one or more ethylenically unsaturated monomers dissolved or dispersed in a polyol in the presence of a free radical catalyst to form a stable dispersion of polymer particles in the polyol. These polymer polyols have the valuable property of imparting to, for example, polyurethane foams and elastomers produced therefrom, higher load-bearing properties than are provided by the corresponding unmodified polyols.

As used herein "viscosity" is in centistokes (cSt) measured at 25° C. on a Cannon Fenske viscometer.

Polyols suitable for use as the base polyol (A) in the present invention include, for example, polyether polyols. Suitable polyether polyols include those having a functionality of at least about 2, preferably at least about 2, and more preferably at least about 3. The functionality of suitable polyether polyols is less than or equal to about 8, preferably less than or equal to about 6, and most preferably less than or equal to about 5. The suitable polyether polyols may also have functionalities ranging between any combination of these upper and lower values, inclusive. The OH numbers of suitable polyether polyols is at least about 10, preferably at least about 15, and most preferably at least about 20. Polyether polyols typically also have OH numbers of less than or equal to about 180, preferably less than or equal to about 150, more preferably less than or equal to about 100, and most preferably less than or equal to about 75. Suitable polyether polyols may also have OH numbers ranging between any combination of these upper and lower values, inclusive. The (number average) molecular weights of suitable polyether polyols is typically greater than about 600, preferably at least about 2,000 and most preferably at least about 3,000. Suitable polyether polyols typically have (number average) molecular weights of less than or equal to 15,000, more preferably less than or equal to 12,000 and most preferably less than or equal to 8,000. Suitable polyether polyols may also have (number average) molecular weights ranging between any combination of these upper and lower values, inclusive.

In summary, suitable polyether polyols typically have functionalities ranging from about 2 to about 8, preferably from about 2 to about 6, and most preferably from about 3 to about 5; OH numbers ranging from about 10 to 180, preferably from about 15 to about 150, more preferably from about 15 to about 100, and most preferably from about 20 to about 75; and (number average) molecular weights ranging from greater than 600 to about 15,000, preferably about 2,000 to 12,000 and most preferably about 3,000 to 8,000.

As used herein, the hydroxyl number is defined as the number of milligrams of potassium hydroxide required for the complete hydrolysis of the fully phthalylated derivative prepared from 1 gram of polyol.

Examples of suitable base polyols include: polyoxyethylene glycols, triols, tetrols and higher functionality polyols, polyoxypropylene glycols, triols, tetrols and higher functionality polyols, and mixtures thereof. When ethylene oxide and propylene oxide mixtures are used, the ethylene oxide and propylene oxide may be added simultaneously or sequentially to provide internal blocks, terminal blocks or a random distribution of the oxyethylene groups and/or oxypropylene groups in the polyether polyol. Suitable starters or initiators for the base polyol include, for example, ethylene glycol, propylene glycol, diethylene glycol, dipropylene glycol, tripropylene glycol, trimethylol-propane, glycerol, pentaerythritol, sorbitol, sucrose, ethylenediamine, and toluene diamine. By alkoxylation of the starter, a suitable polyether polyol useful as the base polyol component can be formed. The alkoxylation reaction may be catalyzed using any conventional catalyst including, for example, potassium hydroxide (KOH) or a double metal cyanide (DMC) catalyst.

Other polyols suitable for use as the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as castor oil, and alkylene oxide adducts of polyhydroxyalkanes other than those described above.

Illustrative alkylene oxide adducts of polyhydroxyalkanes include: alkylene oxide adducts of 1,3-dihydroxypropane, 1,3-di-hydroxybutane, 1,4-dihydroxybutane, 1,4-, 1,5- and 1,6-dihydroxyhexane, 1,2-, 1,3-, 1,4-1,6- and 1,8-dihydroxy-octant, 1,10-dihydroxydecane, glycerol, 1,2,4-tirhydroxybutane, 1,2,6-trihydroxyhexane, 1,1,1-trimethyl-olethane, 1,1,1-trimethylolpropane, pentaerythritol, caprolactone, polycaprolactone, xylitol, arabitol, sorbitol, mannitol, and the like.

Other polyols which can be used as a base polyol include the alkylene oxide adducts of non-reducing sugars, wherein the alkoxides have from 2 to 4 carbon atoms. Non-reducing sugars and sugar derivatives include sucrose; alkyl glycosides such as methyl glycoside and ethyl glycoside; glycol glucosides such as ethylene glycol glycoside, propylene glycol glucoside, glycerol glucoside, and 1,2,6-hexanetriol glucoside; as well as alkylene oxide adducts of the alkyl glycosides such as those disclosed in U.S. Pat. No. 3,073,788.

Other suitable polyols include the polyphenols and preferably the alkylene oxide adducts thereof in which the alkylene oxides have from 2 to 4 carbon atoms. Among the suitable polyphenols are bisphenol A, bisphenol F, condensation products of phenol and formaldehyde, the novolac resins, condensation products of various phenolic compounds and acrolein, including the 1,1,3-tris(hydroxy-phenyl)propanes, condensation products of various phenolic compounds and glyoxal, glutaraldehyde, and other dialdehydes, including the 1,1,2,2-tetrakis(hydroxyphenol)ethanes.

The alkylene oxide adducts of phosphorus and polyphosphorus acid are also useful polyols, These include ethylene oxide, 1,2-epoxy-propane, the epoxybutanes, and 3-chloro-1,2-epoxypropane as preferred alkylene oxides. Phosphoric acid, phosphorus acid, the polyphosphoric acids such as, tripolyphosphoric acid, and the polymetaphosphoric acids, are also useful.

Blends or mixtures of various useful polyols may be used if desired. In polyols other than those considered to be preferred, useful monomer contents and monomer or monomers may vary. Similarly, it may be desirable or even necessary to modify the stabilizer of this invention when such other polyols are used. This can be accomplished by following the criteria discussed hereinafter in connection with the stabilizers used for the preferred polyols.

The preformed stabilizers (B) of the present invention are characterized by inclusion of at least three different ethylenically unsaturated monomers in the mixture subjected to free radical polymerization with an ethylenically unsaturated macromer. Any of the methods for producing preformed stabilizers known to those skilled in the art may be used to produce these preformed stabilizers. Suitable methods are disclosed, for example, in U.S. Pat. No. 4,148,840 (Shah); U.S. Pat. No. 5,196,476 (Simroth); U.S. Pat. No. 5,364,906 (Critchfield); U.S. Pat. No. 5,990,185 (Fogg); U.S. Pat. No. 6,013,731 (Holeschovsky et al); and U.S. Pat. No. 6,455,603 (Fogg).

Suitable preformed stabilizers include those so-called intermediates obtained by reacting a macromolecule with at least three monomers (i.e. acrylonitrile, styrene, methyl methacrylate, hydroxyethylmethacrylate, etc.), to give a copolymer (dispersion having a low solids content, e.g. <30% or soluble grafts, etc.). The macromolecule may be obtained by linkage of polyether polyols through coupling with a material such as a polyisocyanate, epoxy resin, or by other means known to produce a high molecular weight polyol.

The macromolecule preferably contains reactive unsaturation and is, in general, prepared by the reaction of the selected reactive unsaturated compound with a polyol.

The terminology "reactive unsaturated compound," refers to any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds satisfying these criteria include the maleates, fumarates, acrylates, and methacrylates. While not alpha, beta unsaturated compounds, polyol adducts formed from substituted vinyl benzenes, such as chloromethylstyrene, likewise may be utilized. Illustrative examples of suitable alpha, beta unsaturated compounds which may be employed to form the precursor stabilizer include maleic anhydride, fumaric acid, dialkyl fumarates, dialkyl maleates, glycol maleates, glycol fumarates, isocyanatoethyl methacrylate, 1,1-dimethyl-m-isopropenylbenzyl-isocyanate, methyl methacrylate, hydroxyethyl methacrylate, acrylic and methacrylic acid and their anhydride, methacroyl chloride and glycidyl methacrylate. The level of ethylenic unsaturation in the precursor stabilizer may vary widely. The minimum and maximum levels of unsaturation are each constricted by the dispersion stability that the precursor stabilizer is capable of imparting to the polymer polyol composition. The specific level of unsaturation utilized will depend on the molecular weight and functionality of the polyol used to prepare the precursor stabilizer. Optionally, a diluent, polymer control agent or chain transfer agent molecular weight regulator may be present.

The preformed stabilizer of the invention is produced from at least the following components:
(1) a macromolecule, macromer or other suitable precursor stabilizer;
(2) at least three different free radically polymerizable ethylenically unsaturated monomers, preferably, styrene, acrylonitrile, and a hydroxyl-containing acrylate/methacrylate such as 2-hydroxypropyl acrylate or 2-hydroxyethyl methacrylate, most preferably, 2-hydroxymethacrylate (HEMA);
(3) a free radical polymerization initiator;
(4) optionally, a diluent in which (1), (2), and (3) are soluble, but in
which the resultant preformed stabilizer is essentially insoluble; and/or
(5) optionally, one or more chain transfer agents.

As described in, for example, U.S. Pat. No. 5,196,476, suitable preformed stabilizers can be prepared by reacting a combination of components (1), (2), (3), and, optionally (4) and/or optionally (5), above, in a reaction zone maintained at a temperature sufficient to initiate a free radical reaction, and under sufficient pressure to maintain only liquid phases in the reaction zone, for a sufficient period of time to react (1), (2) and (3); and recovering a mixture containing the preformed stabilizer dispersed in the polymer control agent.

Suitable compounds to be used as the macromolecule, the macromer or the precursor stabilizer (i.e. component (1) above) include: compounds which contain reactive unsaturation (e.g. acrylate, methacrylate, maleate, fumarate, isopropenylphenyl, vinyl silyl, etc.), obtained by reacting compounds containing reactive unsaturation with alcohols having the average formula $A(OROX)_{\geq 1}$. Examples of unsaturation containing compounds include but are not limited to, maleic anhydride, fumaric acid, dialkyl fumarates, dialkyl maleates, glycol maleates, glycol fumarates, isocyanatoethyl methacrylate, methyl methacrylate, hydroxyethyl methacrylate, acrylic and methacrylic acid and their anhydride, methacryl chloride, and glycidyl methacrylate, and vinylmethoxysilane.

The reactive unsaturated compound may also be the reaction product of one or more molecules resulting in a structure with the desired qualities of a reactive unsaturated compound. For example, hydroxymethyl or hydroxyethyl methacrylate can be reacted with a polyol by way of coupling through use of an organic polyisocyanate as described in, for example, U.S. Pat. No. 4,521,546, or by reaction with an unsaturated mono-isocyanate such as 1,1-dimethyl-m-isopropenylbenzyl isocyanate.

Suitable compounds to be used component (2) used to produce the preformed stabilizer of the present invention include: reactive unsaturated compounds, particularly those that are free radically polymerizable. Some examples of suitable compounds include aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. Mixtures of three or more of the aforementioned monomers are also suitable for making the pre-formed stabilizer. Of the above monomers, the monovinylidene aromatic monomers, particularly styrene, and the ethylenically unsaturated nitriles, particularly acrylonitrile, and α,β-ethylenically unsaturated carboxylic esters, particularly 2-hydroxyethyl acrylates are preferred.

It is preferred that component (2) used to produce the preformed stabilizer be acrylonitrile and at least two other ethylenically unsaturated comonomers copolymerizable with acrylonitrile. Examples of ethylenically unsaturated comonomer copolymerizable with acrylonitrile include styrene and its derivatives, acrylates, methacrylates such as methyl methacrylate, and vinylidene chloride.

It is particularly preferred to utilize acrylonitrile with styrene and hydroxyl acrylates and to maintain a minimum of about 10 to 80 percent by weight acrylonitrile in the system. Styrene is generally preferred as one of the other co-monomers, but methyl methacrylate or other monomers may be used in place of part or all of the styrene. 2-Hydroxyethyl methacrylate (HEMA) is also preferred as a co-monomer.

A preferred monomer mixture (2) used to make the preformed stabilizer composition (B) of the present invention includes: acrylonitrile, styrene, and 2-hydroxyethyl methacrylate (HEMA). The weight proportion of acrylonitrile in this preferred monomer mixture can range from about 10 to 80 weight percent of the co-monomer mixture, more typically from about 20 to about 60 weight percent. Styrene can accordingly vary from about 10 to about 80 weight percent, more preferably from 20 to 60 weight percent of the mixture, and HEMA can range from about 10 to about 80 weight percent of the co-monomer mixture, more typically from about 15 to about 75 weight percent. A ratio of acrylonitrile/styrene to HEMA in the monomer mixture of from about 85/15 to 25/75 is particularly preferred, even more particularly about 80/20 to 40/60. Within the acrylonitrile/styrene ratio, the acrylonitrile to styrene ratio can vary from 20/80 to 80/20.

The free radical polymerization initiators suitable for use as component (3) in producing the preformed stabilizers of the present invention include any free radical catalyst suitable for grafting an ethylenically unsaturated polymer to a polyol. Examples of suitable free-radical polymerization initiators for the present invention include: initiators such as peroxides including both alkyl and aryl hydro-peroxides, persulfates, perborates, percarbonates, and azo compounds. Specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), and 2,2'-azo bis-(2-methylbutyronitrile).

Useful catalysts also include those catalysts having a satisfactory half-life within the temperature ranges used to form the preformed stabilizer. A satisfactory half-life will generally be about 25 percent or less of the residence time in the reactor at a given temperature. Representative examples of useful catalyst species include t-butyl peroxy-2-ethyl-hexanoate, t-butylperpivalate, t-amyl peroctoate, 2,5-dimethylhexane-2,5-di-per-2-ethyl hexoate, t-butylperneodecanoate, and t-butylperbenzoate. Also useful are the azo catalysts such as azobis-isobutyronitrile, 2,2'-azo bis-(2-methylbutyronitrile), and mixtures thereof. The preferred free radical catalysts are peroxides such as tertiary butyl peroctoate.

Suitable catalyst concentrations range from about 0.01 to about 2% by weight, preferably from about 0.05 to 1% by weight, and most preferably 0.05 to 0.3% by weight, based on the total weight of the components (i.e. 100% by weight of the combined weight of the macromer, the ethylenically unsaturated monomer, the free-radical polymerization initiator and, optionally, the liquid diluent and/or the polymer control agent). Up to a certain point, increases in the catalyst concentration result in increased monomer conversion and grafting. However, after that point, further increases in catalyst concentration do not substantially increase monomer conversion. Catalyst concentrations which are too high can cause cross-linking in the preformed stabilizer (B). The particular catalyst concentration selected will usually be an optimum value determined by taking into consideration all factors, including cost.

In accordance with the present invention, a diluent (4) in which components (1), (2), and (3) of the pre-formed stabilizer are soluble, but in which the resultant preformed stabilizer (B) is essentially insoluble, is optional. When present, this may be one diluent or a mixture of diluents.

Suitable diluents include various mono-ols (i.e. monohydroxy alcohols), polyols, aromatic hydrocarbons, ethers, and other liquids. As long as the compound used as the diluent does not adversely affect the performance of the preformed stabilizer (B), it is suitable for use in the practice of the invention. Preferred diluents are the mono-ols because of the ease with which they may be stripped from the final polymer/polyol composition. Mixtures of one or more mono-ols may be used. The choice of mono-ol is not critical. It should not, however, form two phases at reaction conditions and should be readily stripped from the final polymer/polyol.

The mono-ol is typically an alcohol containing at least one carbon atom, such as methanol, ethanol, n-propanol, isopropanol, n-butanol, sec.-butanol, t-butanol, n-pentanol, 2-pentanol, 3-pentanol, and the like, and mixtures of the same. The preferred mono-ol is isopropanol. Possible polyols for use as diluent (4) include either singly or as mixtures, those polyols discussed previously for use as base polyol (A). It is preferred that a polyol used as diluent (4) be the same as or equivalent to the polyol used in the formation of precursor used to prepare the preformed stabilizer (PFS). The concentration of polyol in the diluent (4), if used, is limited to an amount below that at which gelling occurs in preformed stabilizer (B).

The chain transfer agents suitable as component (5) in the present invention include: methanol, isopropanol, ethanol, tert-butanol, toluene, ethylbenzene, triethylamine, dodecylmercaptan, octadecylmercaptan, carbon tetrachloride, carbon tetrabromide, chloroform, and methylene chloride. Chain transfer agents are also commonly referred to as molecular weight regulators. These compounds are used in conventional amounts to control the molecular weight of the copolymerizate.

Because of the number of components, the variability of their concentration in the feed, and the variability of the operating conditions of temperature, pressure, and residence or reaction times, it is possible to achieve the benefits of the present invention under a variety of processing conditions. Therefore, it is prudent to test particular combinations of processing parameters to confirm the most suitable operating mode for producing a particular final polymer polyol product.

In general, the amount of the components in the formulation, on a weight percent of the total formulation for forming the preformed stabilizer (B) of the present invention is as follows:
 (1) from about 10 to about 40 wt. %, preferably, from about 15 to 35 wt. % of a macromolecule, macromer or precursor stabilizer;
 (2) from about 10 to about 30 wt. %, preferably, from about 15 to about 25 wt. % of at least three different free radically polymerizable ethylenically unsaturated monomers,
 (3) from about 0.1 to about 2 wt. % of a free radical polymerization initiator,
 (4) optionally, from about 30 to about 80 wt. %, preferably, from about 40 to about 70 wt. %, of a diluent, and
 (5) optionally, from 0 to about 10 wt. %, preferably, from 0 to about 5 wt. % of one or more chain transfer agents.

In the above-given formulation, the wt. %'s of components 1, 2, 3, and optionally 4, and optionally 5, total 100% by weight of component (B), the preformed stabilizer.

The process for producing the preformed stabilizer (B) is similar to the process for making the polymer polyol. The temperature range is not critical and may vary from about 80° C. to about 150° C. or perhaps greater, the preferred range being from 115° C. to 125° C. The catalyst and temperature should be selected so that the catalyst has a reasonable rate of decomposition with respect to the hold-up time in the reactor for a continuous flow reactor or the feed time for a semi-batch reactor.

The mixing conditions employed are preferably comparable to those achieved by using a back mixed reactor (e.g., a stirred flask or stirred autoclave). Reactors of this type keep the reaction mixture relatively homogeneous and so prevent localized high monomer to macromer ratios such as those which occur in tubular reactors when all of the monomer is added at the beginning of the reactor.

The preformed stabilizer (B) of the present invention is composed of a dispersion in the diluent and any unreacted monomer in which the preformed stabilizer (B) is probably present as individual molecules or as groups of molecules in "micelles," or on the surface of small polymer particles.

Suitable compounds to be used as the ethylenically unsaturated monomers, i.e. component (C) of the polymer polyols of the present invention include, for example, those ethylenically unsaturated monomers described above with respect to the preformed stabilizer. Suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl actylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. Mixtures of two or more of the aforementioned monomers are also suitable for use in making the pre-formed stabilizer. Of the above monomers, the monovinylidene aromatic monomers, particularly styrene, and the ethylenically unsaturated nitriles, particularly, acrylonitrile, are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being, particularly preferred monomers.

Overall, the quantity of ethylenically unsaturated monomer(s) present in the polymer polyols comprising a preformed stabilizer is preferably at least about 30% by weight, more preferably at least about 35% by weight, and most preferably at least about 40% by weight, based on 100% by weight of the polymer polyol. The quantity of ethylenically unsaturated monomer(s) present in the polymer polyols is preferably about 65% by weight or less, more preferably at least about 60% by weight or less. The polymer polyols of the present invention typically have a solids content ranging between any combination of these upper and lower values, inclusive, e.g. from 30% to 65% by weight, preferably from 30% to 60% by weight, based on the total weight of the polymer polyol. It is more preferred that the solids content be less than 60% by weight, more particularly preferred that the solids content be less than or equal to about 59% by weight, most preferred that the solids content be less than or equal to about 58% by weight, and most particularly preferred that the solids content be less than or equal to about 55% by weight.

Suitable free-radical initiators to be used as component (D) in the present invention include, for example, those described previously as being useful for the formation of the preformed stabilizers. Examples of suitable free-radical polymerization initiators for the present invention include initiators such as, for example, peroxides including both alkyl and aryl hydroper-oxides, persulfates, perborates, percarbonates, and azo compounds. Some specific examples include catalysts such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), and 2,2'-azo bis-(2-methylbutyronitrile).

Useful initiators also include, for example, those catalysts having a satisfactory half-life within the temperature ranges used in forming the polymer polyol. Typically, the half-life of the catalyst should be about 25% or less of the residence time in the reactor at any given time. Preferred initiators for this portion of the invention include acyl peroxides such as didecanoyl peroxide and dilauroyl peroxide, peroxy esters such as t-butyl peroxy-2-ethylhexanoate, t-butylperpivalate, t-amyl peroxy pivalate, t-amyl peroctoate, 2,5-dimethyl-hexane-2,5-di-per-2-ethyl hexoate, t-butyl perneodecanoate, t-butylperbenzoate and 1,1-dimethyl-3-hydroxybutyl peroxy-2-ethyl-hexanoate, and azo catalysts such as azobis(isobutyronitrile), 2,2'-azo bis-(2-methoxyl-butyronitrile), and mixtures thereof. Most preferred are the acyl peroxides described above and the azo catalysts. A particularly preferred initiator is azobis(isobutyronitrile).

Particularly preferred in the practice of the invention, are the use of azo catalysts and the aforementioned peroxy esters of the above formula. The preferred peroxy esters include those which have the unique advantage of effecting the desired degree of polymerization essentially without raising the viscosity of the polymer polyol over that obtained with the azo catalyst. This enhances one's ability to achieve higher solids polymer polyols with good product stability without raising product viscosity. Such peroxy esters can be used in molar amounts substantially less than the amounts required when using other free radical catalysts in forming the polymer polyols.

The quantity of free-radical initiator used herein is not critical and can be varied within wide limits. In general, the amount of initiator ranges from about 0.01 to 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable polymer control agents (PCA) for use as component (E) in the present invention include, for example, those known to be useful in polymer polyols and the processes of preparing polyols such as those described in, for example, U.S. Pat. Nos. 3,953,393, 4,119,586, 4,463,107, 5,324,774, 5,814,699 and 6,624,209. Some examples of suitable compounds useful as polymer control agents include various mono-ols (i.e., monohydroxy alcohols), aromatic hydrocarbons, ethers, and other liquids.

Polymer control agents are also commonly referred to as reaction moderators. These are known to control the molecular weight of the polymer polyol. As long as the compound used as the polymer control agent does not adversely affect the performance of the polymer polyol, it is suitable for use in the practice of the invention. Preferred are the mono-ols because of the ease with which they may be stripped from the final polymer/polyol composition. Mixtures of one or more mono-ols may be used as polymer control agents. The choice of mono-ol is not critical. It should not form two phases at reaction conditions and should be readily stripped from the final polymer/polyol.

Suitable polymer control agents include, for example, one or more mono-ols which are typically alcohols containing at least one carbon atom, such as methanol, ethanol, n-propanol, iso-propanol, n-butanol, sec.-butanol, t-butanol, n-pentanol, 2-pentanol, 3-pentanol, allyl alcohol, and mixtures thereof. The preferred mono-ol is isopropanol. Other known polymer control agents include compounds such as ethylbenzene and toluene. In accordance with the present invention, the most preferred polymer control agents include isopropanol, ethanol, tert-butanol, toluene, and ethylbenzene.

Polymer control agents can be used in substantially pure form (i.e. as commercially available) or can be recovered in crude form from the polymer polyol process and reused as-is. For instance, if the polymer control agent is isopropanol, it can be recovered from the polymer polyol production process and used at any point in a subsequent product campaign in which the isopropanol is present (i.e., such as the production of PFS A and PFS B in Table 1 of U.S. Pat. No. 7,179,882). The amount of crude polymer control agent in the total polymer control agent can range anywhere from 0% up to 100% by weight.

When used, the total amount of polymer control agent (PCA) present in the polymer polyols of the present invention may range from greater than about 3.0% to about 20% (preferably from 4.0 to 15%, more preferably from 5 to 10%) by weight, based on the total weight of the polymer polyol.

The quantity of polymer control agent when employed in the present invention is generally greater than about 3.0% by weight, preferably at least about 3.5%, more preferably at least about 4.0% and most preferably at least about 5.0% by weight, based on the 100% by weight of all components which comprise the polymer polyol, prior to stripping the product, (i.e. components (A), (B), (C), (D), (E), and (F)). The quantity of total polymer control agent, when employed, is generally less than or equal to 20% by weight, preferably less than or equal to about 15%, more preferably less than or equal to 10% and most preferably less than or equal to about 7% by weight, based on the total weight of all components charged to the reactor. The total amount of polymer control agent, if used, will generally be any amount ranging between any combination of these lower and upper values.

The polymer polyol and the process of preparing the polymer polyol may optionally include a chain transfer agent (F). The use of chain transfer agents and their nature is known in the art. Examples of suitable chain transfer agents include compounds such as mercaptans (e.g., dodecane thiol, ethane thiol, octane thiol, and toluene thiol); halogenated hydrocarbons (e.g., carbon tetrachloride, carbon tetrabromide, and chloroform); amines such as diethylamine; and enol-ethers. If used at all in the present invention, a chain transfer agent is preferably used in an amount of from about 0.1 to about 2 wt. %, more preferably from about 0.2 to about 1 wt. %, based on the total weight of the polymer polyol (prior to stripping).

The polymer polyols are preferably produced by using a low monomer to polyol ratio which is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semibatch operation, also by slowly adding the monomers to the polyol.

The temperature range is not critical and may vary from about 100° C. to about 140° or perhaps greater, the preferred range being from 115° C. to 125° C. As has already been noted, the catalyst and temperature should be selected so that the catalyst has a reasonable rate of decomposition with respect to the hold-up time in the reactor for a continuous flow reactor or the feed time for a semi-batch reactor.

The mixing conditions employed should correspond to those obtained using a back mixed reactor (e.g.—a stirred flask or stirred autoclave). The reactors of this type keep the reaction mixture relatively homogeneous and prevent localized high monomer to polyol ratios such as occur in tubular reactors when such reactors are operated with all the monomer added to the beginning of the reactor. In addition, more efficient mixing can be obtained by the use of an external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired.

The polymer polyols of the present invention, after stripping, have a viscosity less than or equal to:

$$V_b e(2.4x) \text{ at } 25° \text{ C., wherein:}$$

$V_b$=viscosity of base polyol in centistokes (cSt) and
X=weight % of solids in polymer polyol/(100 weight % solids in polymer polyol).

The polymer polyols of the present invention are dispersions in which the polymer particles (the same being either individual particles or agglomerates of individual particles) are relatively small in size and, in the preferred embodiment, have a weight average size less than about ten microns. However, when high contents of styrene are used, the particles will tend to be larger; but the resulting polymer polyols are highly useful, particularly where the end use application requires as little scorch as possible.

Following polymerization, volatile constituents, in particular those from the PCA and residues of monomers are generally stripped from the product by the usual method of vacuum distillation, optionally in a thin layer of a falling film evaporator. The monomer-free product may be used as is, or it may be filtered to remove any large particles that may have been created.

In the preferred embodiment, all of the product (i.e., 100%) will pass through the filter employed in the 150 mesh filtration hindrance (filterability) test that will be described in conjunction with the Examples. This ensures that the polymer polyol products can be successfully processed in all types of the relatively sophisticated machine systems now in use for large volume production of polyurethane products, including those employing impingement-type mixing which necessitate the use of filters that cannot tolerate any significant amount of relatively large particles. In addition, a significant amount of the polymer polyol passes the 700 mesh filtration hindrance test, as characterized more fully in the Examples. It should be appreciated that the 700 mesh filtration hindrance test presents the most rigorous test of polymer polyol stability.

The following examples further illustrate details for the preparation and use of the compositions of this invention. The invention, which is set forth in the foregoing disclosure, is not to be limited either in spirit or scope by these Examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the working examples of this invention.

POLYOL A: A propylene oxide adduct of sorbitol containing 16% ethylene oxide cap with a hydroxyl number of 28.
POLYOL B: A propylene oxide adduct of glycerin containing 20% ethylene oxide cap with a hydroxyl number of 36.
POLYOL C: A propylene oxide/ethylene oxide adduct of glycerin and sorbitol containing 18% ethylene oxide cap with a hydroxyl number of 32.
PCA: Isopropanol, a polymer control agent.
SAN: Styrene:acrylonitrile monomer (50/50)
HEMA: 2-Hydroxymethyl methacrylate.
TMI: Isopropenyl dimethyl benzyl isocyanate (an unsaturated aliphatic isocyanate) which is commercially available under the name TMI from Cytec Industries.
INITIATOR A: Tert-butyl peroxy octoate, a free-radical polymerization initiator which is commercially available from Pergan Marshall LLC.
INITIATOR B: 2,2'-Azo-bis-isobutyronitrile, a free-radical polymerization initiator commercially available under the name VAZO 64 from E. I. DuPont de Nemours and Co.
DEOA-LF: Diethanolamine, a commercially available foam crosslinker/foam modifier that is commercially available from Air Products.
DC 5043: A silicone surfactant that is commercially available from Air Products under the designation DC 5043.
33LV: 1,4-Ethylene piperazine catalyst which is commercially available from Air Products under the name DABCO 33LV.
NIAX A-1: Amine catalyst which is commercially available from Momentive Performance Materials under the name NIAX A-1.
TDI: Toluene diisocyanate containing approximately 80% by weight of the 2,4-isomer and about 20% by weight of the 2,6-isomer.
MDI: A 2,4'-diphenylmethanediisocyanate and 4,4'-diphenylmethanediisocyanate mixture VISCOSITY: Viscosities were measured by a Cannon Fenske viscometer (cSt at 25° C.).

FILTERABILITY: Filterability was determined by diluting one part by weight sample (e.g. 200 grams) of polymer polyol with two parts by weight anhydrous isopropanol (e.g. 400 grams) to remove any viscosity-imposed limitations and using a fixed quantity of material in relative to a fixed cross-sectional area of screen (e.g. 1⅛ in. diameter), such that all of the polymer polyol and isopropanol solutions passes by gravity through a 150-mesh or 700-mesh screen. The 150-mesh screen has a square mesh with average mesh opening of 105 microns and it is a "Standard Tyler" 150 square-mesh screen. The 700-mesh screen is made with a Dutch twill weave. The actual screen used had a nominal opening of 30 microns. The amount of sample which passes through the screen within 600 seconds is reported in percent, a value of 100 percent indicates that over 99 weight percent passes through the screen.

MACROMER: Prepared by heating 100 parts by weight of POLYOL A, 0.5 parts by weight of TMI, 0.4 parts by weight of MDI and 100 parts per million of CosCat 83 catalyst (an organobismuth catalyst that is commercially available from Vertellus Performance Materials) at 75° C. for 4 hours.

Examples 1 and 2

Preformed Stabilizer (PFS) Preparation

The pre-formed stabilizer (PFS) was prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120° C. The product from the second-stage reactor overflowed continuously through a pressure regulator designed to control the pressure in each stage at 65 psig. The pre-formed stabilizer then passed through a cooler and into a collection vessel. The preformed stabilizer formulations are disclosed in TABLE 1.

In the preformed stabilizer compositions described in TABLE 1, the wt. % concentrations reported are based on the total feed. HEMA is either not present (Example 1) or added as 20% by weight of the total amount of monomer used to make the PFS of Example 2.

TABLE 1

| Material | Example 1 | Example 2 |
| --- | --- | --- |
| PCA (wt. % in feed) | 30-80 | 30-80 |
| MACROMER (wt. % in feed) | 10-40 | 10-40 |
| Monomer concentration in feed (wt. %) | 10-30 | 10-30 |
| SAN:HEMA | 100:0 | 80:20 |
| INITIATOR A (wt. %) | 0.1-2 | 0.1-2 |

Examples 3-5

Polymer Polyol Preparation

This series of examples relates to the preparation of polymer polyols. The polymer polyols were prepared in a two-stage reaction system comprising a continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The feed consumption is reported in TABLE 2.

The temperature of the reaction mixture was controlled at 115±5° C. The product from the second-stage reactor overflowed continuously through a pressure regulator designed to control the pressure in each stage at 45 psig. The polymer polyol then passed through a cooler and into a collection vessel. The run time for production of each of the polymer polyols described in TABLE 2 was approximately 19 hours.

The crude product was vacuum stripped to remove volatiles. The wt. % total polymer in the product was calculated from the concentrations of monomers measured in the crude polymer polyol before stripping. The preformed stabilizers of Examples 1 and 2 were used to produce the polymer polyols described in TABLE 2.

TABLE 2

|  | EXAMPLE 3* | EXAMPLE 4 | EXAMPLE 5* |
| --- | --- | --- | --- |
| POLYOL B (wt. %) | 52.11 | 52.09 | 52.10 |
| PFS/amount in wt. % | EXAMPLE 1/ 6.92 | EXAMPLE 2/ 6.92 | EXAMPLE 1/ 6.92 |
| INITIATOR B (wt. %) | 0.29 | 0.28 | 0.29 |
| Styrene (wt. %) | 25.76 | 25.77 | 25.64 |
| Acrylonitrile (wt. %) | 14.92 | 14.92 | 14.83 |
| HEMA (wt. %) | 0 | 0.22[1] | 0.22[2] |
| % Total Solids | 43.03 | 42.99 | 43.01 |
| 700-Mesh Filtration (s) | 237 | 296 | 235 |
| Viscosity (cSt) | 5132 | 5031 | 5229 |

*Comparative Example
[1] No HEMA added to monomers in polymer polyol feed. Added via PFS Example 2.
[2] HEMA added as third monomer to polymer polyol feed.

Examples 6-8

Foam Preparation

A free-rise foam was prepared with each of the polymer polyols produced in Examples 3, 4 and 5. The general formulation for these foams was as follows:

- 55 parts by weight of a Polymer Polyol from EXAMPLE 3, EXAMPLE 4 or EXAMPLE 5
- 45 parts by weight of POLYOL C
- 3.08 parts by weight of water
- 1.38 parts by weight of DEOA-LF
- 1.0 parts by weight of DC 5043
- 0.35 parts by weight of DABCO 33LV
- 0.08 parts by weight of NIAX A-1
- 38.33 parts by weight of TDI (Index—100).

The above-listed materials were combined in the specified amounts as follows. The polymer polyol, crosslinker (DEOA-LF), catalysts (NIAX A-1 and DABCO 33LV), water, and silicone surfactant (DC 5043) were mixed. While being mixed TDI was added and the contents were mixed. The mixture was then poured into a 14 by 14 by 6-inch cardboard box, where it rose freely until the reaction was complete. The foam was then heated in an oven at 225° C. for 5 minutes. Foam properties were determined according to ASTM Standard D-3574-66.

The properties of the foams produced in this manner are reported in TABLE 3.

TABLE 3

|  | EXAMPLE 6* | EXAMPLE 7 | EXAMPLE 8* |
|---|---|---|---|
| Polymer Polyol (EXAMPLE #) | 3 | 4 | 5 |
| Density (pounds per cubic foot) | 2.1 | 2.1 | 2.1 |
| IFD 25% (pounds) | 40.5 | 41.5 | 38.0 |
| IFD 65% (pounds) | 109.9 | 116.9 | 107.9 |
| Tear (psi) | 1.59 | 1.64 | 1.49 |
| HACS 50% | 19.2 | 17.8 | 19.3 |
| Wet Set 50% | 32.9 | 27.3 | 33.7 |

*Comparative Example

As can be seen from EXAMPLE 7 (illustrative of the present invention), the addition of a small amount of HEMA to the preformed stabilizer significantly improved the properties of foams made with the polymer polyol produced from that preformed stabilizer. The foam produced in comparative EXAMPLE 6 had no added HEMA. The foam produced in comparative EXAMPLE 8 was produced from a polymer polyol produced in which HEMA was added as a third monomer in the polymer polyol production process at the same overall weight percent as obtained by adding HEMA to preformed stabilizer produced in accordance Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A preformed stabilizer formed by free-radical polymerization of a mixture comprising:
    (a) at least one ethylenically unsaturated macromolecule or macromer,
    with
    (b) at least three different radically polymerizable ethylenically unsaturated monomers,
    in the presence of
    (c) at least one free-radical polymerization initiator,
    and, optionally,
    (d) a liquid diluent,
    and, optionally,
    (e) a chain transfer agent.

2. The preformed stabilizer of claim 1 in which (b) includes acrylonitrile and/or styrene.

3. The preformed stabilizer of claim 1 in which (b) includes a mixture of styrene and acrylonitrile in a weight ratio of 80:20 to 20:80.

4. The preformed stabilizer of claim 3 in which the styrene and acrylonitrile constitute at least 20% by weight of the total weight of (b).

5. The preformed stabilizer of claim 1 in which (b) includes an ethylenically unsaturated monomer containing a hydroxyl group.

6. The preformed stabilizer of claim 1 in which (b) includes at least one ethylenically unsaturated monomer selected from the group consisting of 2-hydroxyethyl acrylate, 2-hydroxyethyl methacrylate, hydroxypropyl acrylate, and hydroxypropyl methacrylate.

7. The preformed stabilizer of claim 4 in which (b) further includes at least one ethylenically unsaturated monomer selected from the group consisting of 2-hydroxyethyl acrylate, 2-hydroxyethyl methacrylate, hydroxypropyl acrylate, and hydroxypropyl methacrylate.

8. The preformed stabilizer of claim 1 in which (c) is selected from the group consisting of one or more peroxide initiators, one or more azo initiators and mixtures thereof.

9. The preformed stabilizer of claim 7 in which (c) is selected from the group consisting of one or more peroxide initiators, one or more azo initiators and mixtures thereof.

10. The preformed stabilizer of claim 1 in which (d) is selected from the group consisting of a mono-ol, a polyol, a hydrocarbon, an ether and mixtures thereof.

11. The preformed stabilizer of claim 9 in which (d) is selected from the group consisting of a mono-ol, a polyol, a hydrocarbon, an ether and mixtures thereof.

12. The preformed stabilizer of claim 1 in which (e) is selected from the group consisting of methanol, isopropanol, ethanol, tert-butanol, toluene, ethylbenzene, triethylamine, dodecylmercaptan, octadecylmercaptan, carbon tetrachloride, carbon tetrabromide, chloroform, and methylene chloride.

13. A continuous process for preparing a polymer polyol comprising:
    free-radically polymerizing:
    (1) a base polyol,
    (2) the preformed stabilizer of claims 1,
    and
    (3) at least one ethylenically unsaturated monomer,
    in the presence of
    (4) at least one free-radical polymerization initiator comprising an azo compound that is free of nitrile groups,
    and, optionally,
    (5) a polymer control agent, and optionally
    (6) a chain transfer agent.

14. A polymer polyol produced by the process of claim 13.

* * * * *